United States Patent Office 3,281,395
Patented Oct. 25, 1966

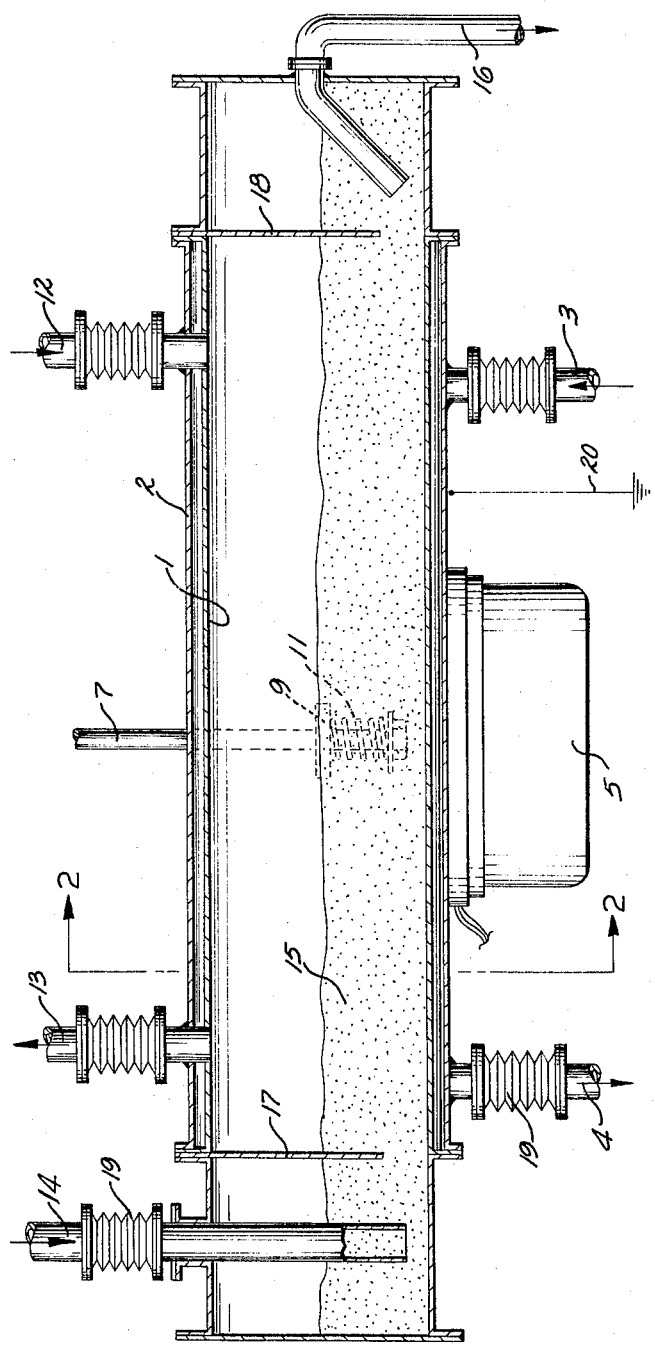
FIG. 1
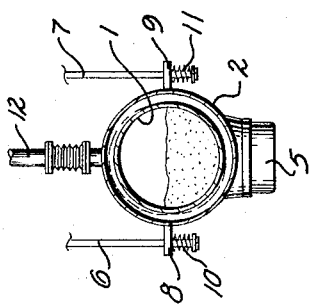
FIG. 2
INVENTORS
YASUTAKA ISHIBASHI
SHOGO FUJITA
EIJI FUKITA
BY
ATTORNEY

3,281,395
METHOD OF PREPARING FORMALDEHYDE BY VIBRATION
Eiji Fukita, Shogo Fujita, and Yasutaka Ishibashi, Kurashiki, Japan, assignors to Kurashiki Rayon Co. Ltd., Kurashiki, Japan, a corporation of Japan
Filed Apr. 11, 1963, Ser. No. 272,371
Claims priority, application Japan, Apr. 21, 1962, 37/16,450
3 Claims. (Cl. 260—67)

This invention relates to a method of preparing formaldehyde by vibration, and to the apparatus for accomplishing this method.

Our invention is directed to the apparatus and method of the vapor phase polymerization of formaldehyde by means of mechanically vibrating the housing or container in which the polymerization of formaldehyde is accomplished.

An object of our invention is to prevent the formation of a scale or coating of the polymerized product from sticking to the inner wall of the reaction chamber, this being accomplished by mechanically vibrating the entire reaction chamber during polymerization.

Another object of our invention is to provide continuous agitation or vibration to the reaction chamber during polymerization which achieves the proper moving and continuous discharge of the powdered formaldehyde. In previous apparatus a coating or scale has always formed on the inside of the reactor, due to the nature of the polymerizing reaction. This scale or coating is very hard and will gradually build up on the interior wall of the reactor until it becomes several millimeters thick, thus materially retarding the effective chemical reaction necessary to form the formaldehyde.

Another object of our invention is to provide a means of vibrating the entire polymerizing reactor so that the entire inner wall thereof will be freed of accumulated scale or coating, and will effectively keep the inner walls of the reactor free of any coating, all of which has heretofore been impossible to achieve even with scraping devices and the like, which only free a part of the inner wall or structure of a polymerizing reactor from an accumulated coating or scale.

Still another object of our invention is to provide an apparatus and method of the character described in which the polymerized powder in the reactor and the catalyzing agent will be more effectively mixed, and where a steady uninterrupted supply of the discharge powder will be maintained; also there will be a more rapid heat transmission to the material within the reactor.

Still another object of our invention is to provide an apparatus and method of the character described in which the structure of the reactor can be materially simplified, so that it may be effectively cleaned at intervals as required.

Other objects, advantages and features of invention may appear from the accompanying drawing, the subjoined detailed description and the appended claims.

In the drawing:

FIGURE 1 is a longitudinal vertical sectional view of our apparatus for preparing formaldehyde.

FIGURE 2 is a sectional view on a reduced scale taken on line 2—2 of FIGURE 1.

Referring more particularly to the drawing, the numeral 1 indicates a reactor, which may be cylindrical or other appropriate shape, and may be arranged either horizontally, vertically, or inclined, as required. As illustrated, the cylinder 1 is slightly inclined to the horizontal so that the material therein will move continuously from one end to the other. A jacket 2 partially surrounds the cylinder 1, and this jacket provides appropriate control for the reaction temperature, in that hot water, cold water, brine, or other gas or fluid may be circulated within this jacket to maintain the proper temperature within the reactor cylinder 1. An intake pipe 3 extends into the jacket 2, and an outlet pipe 4 extends from this jacket so that the proper gas or fluid can be circulated therethrough. A vibrator 5, preferably of the electrical type, is attached to the outside jacket 2 and the electrical coil therein (not shown) maintains a constant vibration of the entire reaction cylinder 1 during the time that the chemical process is carried out. The vibrator 5 is of the usual and well known construction and imparts only a small but continuous vibration, for example, about 3 millimeters more or less. The entire reactor 1 is suspended on rods 6–7 or the like, and these rods extend through ears 8–9 respectively on the jacket 2. Suitable springs or rubber blocks 10–11 are arranged between the rods 6–7 and the ears 8–9 respectively, so that the entire reaction chamber is suspended on yieldable springs to permit of the continuous vibration by the vibrator 5, previously described. Normally a cooling fluid is circulated through the jacket 2 to carry off the reaction heat far within the reactor 1.

The appropriate formaldehyde vapor, or this vapor mixed with other compositions, enters the reactor in the proper quantities through the pipe 12. Surplus gas, which has not gone through the reaction, will escape through the pipe 13. This latter gas will be accumulated and recirculated. The catalyzing agent, such as nitrogenous macromolecule, is fed into the reactor through the pipe 14. This catalyzing agent may be fed separately or it may be mixed with the formaldehyde powder, but it will be gradually mixed into the reacting powder layer 15 within the reactor 1. A discharge pipe 16 extends from one end of the reactor cylinder 1 as shown, and the polymerized formaldehyde powder will continuously overflow through this pipe as the reaction continues. Both of the conduits 14 and 16 are properly sealed off so that no powder will escape around them, and also to prevent any gas leakage from the reactor 1.

A pair of vertical baffle plates 17 and 18 extend vertically part way through the reactor cylinder 1, for the purpose of insuring the proper mixing of the gases and powdered material within the reactor.

Each of the pipes 3, 4, 12, 13 and 14 are provided with a flexible bellows or diaphragm-like connection 19 so that the entire reactor chamber 1 can vibrate without damaging or rupturing any of these pipes. These bellows or diaphragms prevent the transmission of vibration to the various intake and outlet pipes. The vibrator 5 is preferably of the electromagnetic type, and the direction of vibration is at right-angles to the longitudinal center line of the reactor chamber 1. This constant vibration will also tend to move the powder charge 15 within the reactor 1 towards the outlet pipe 16. This is also accentuated by a slight slope of the reactor 1. A ground wire 20 is provided to discharge the static electrical charge generated in the powder by the constant vibration.

As an example, the reactor chamber 1 moves a volume of 80 liters. The formaldehyde vapor supplied to the reactor 1 is at the rate of 4 kilograms per hour. The catalyzer is a nitrogenous macromolecule and this is supplied at the rate of 40 grams per hour. The reaction temperature is 45° C. The electrical vibrator 5 has a capacity of 750 watts. The amplitude of vibration may be about 3 mm. The vibration cycle is 3,600 times per minute. The vibration is substantially at right-angles to the horizontal center line of the reactor 1 as here shown.

Having described out invention, We claim:

1. The method of polymerization of formaldehyde by vibration consisting of:
   first introducing formaldehyde in vapor phase and a catalyst consisting of nitrogenous macromolecules into a layer of reacting powder in a reactor chamber, withdrawing the polymerized formaldehyde powder from the reactor chamber and vibrating the reactor chamber during the passage of the formaldehyde therethrough.

2. The method of polymerization of formaldehyde by vibration consisting of:

introducing formaldehyde in vapor phase and a catalyst consisting of nitrogenous macromolecules in a continuous stream into a layer of reacting powder in a reactor chamber, said catalyst being introduced into a reactor chamber separate from the formaldehyde vapor, then withdrawing the formaldehyde powder from the reactor chamber and continuously vibrating the reactor chamber during the passage of the polymerized formaldehyde powder therethrough.

3. The method of polymerization of formaldehyde by vibration consisting of:

introducing formaldehyde in vapor phase and a catalyst consisting of nitrogenous macromolecules in a continuous stream into a layer of reacting powder in a reactor chamber, said catalyst being introduced into a reactor chamber separate from the formaldehyde vapor, and permitting the surplus gaseous formaldehyde to escape from the reaction chamber through a pipe, then withdrawing the formaldehyde powder from the reactor chamber and continuously vibrating the reactor chamber during the passage of the polymerized formaldehyde powder therethrough.

References Cited by the Examiner

UNITED STATES PATENTS

| | | | |
|---|---|---|---|
| 2,498,405 | 2/1950 | Fader | 23—288.3 |
| 2,951,059 | 8/1960 | Axtell et al. | 260—67 |
| 3,087,911 | 4/1963 | Ainsworth | 260—67 |
| 3,091,599 | 5/1963 | Jean | 260—67 |
| 3,093,617 | 6/1963 | Hudgin et al. | 260—67 |

JOSEPH L. SCHOFER, *Primary Examiner.*

LOUISE P. QUAST, *Examiner.*

L. M. MILLER, *Assistant Examiner.*